US006057769A

United States Patent [19]

Stevenson

[11] Patent Number: 6,057,769

[45] Date of Patent: May 2, 2000

[54] INTELLIGENT ALARM SYSTEM WITH SNOW SENSOR

[75] Inventor: Carl R. Stevenson, Macungie, Pa.

[73] Assignee: Lucent Technologies Inc., Murray Hill, N.J.

[21] Appl. No.: 09/183,691

[22] Filed: Oct. 30, 1998

[51] Int. Cl.$^{7}$ .............................. G01N 1/00

[52] U.S. Cl. .............................. 340/601; 340/602; 340/539; 340/583; 368/11; 368/73; 368/246; 368/250; 368/256; 73/170.16; 73/170.17; 73/170.21; 73/170.26; 356/338; 356/342

[58] Field of Search .............................. 340/601, 602, 340/539, 583; 368/11, 73, 246, 250, 256; 250/293; 73/170.16, 170.17, 170.21, 170.26; 356/342, 338

[56] References Cited

U.S. PATENT DOCUMENTS

| | | | |
|---|---|---|---|
| 3,801,779 | 4/1974 | Ver Sluis | 340/601 |
| 4,122,660 | 10/1978 | Canavan | 340/601 |
| 4,301,524 | 11/1981 | Koepp et al. | 368/261 |
| 5,345,223 | 9/1994 | Rutkiewicz | 340/581 |
| 5,703,568 | 12/1997 | Hegyi | 340/602 |

*Primary Examiner*—Julie Lieu
*Attorney, Agent, or Firm*—Schnader Harrison Segal & Lewis, LLP

[57] ABSTRACT

The intelligent alarm system of the present invention provides a reliable, low cost system for alerting a user to the presence of snow outside of a building. The system includes a sensor and an intelligent alarm clock for use inside a building or dwelling. The system can be set by a user to signal an alarm a programmable amount of time earlier or later than the user's normal waking time if an accumulation of snow is detected. The system is capable of processing preprogrammed data, user entered data and data accumulated from the sensor to determine whether a true snow condition exists and to generate an appropriate alarm signal.

11 Claims, 1 Drawing Sheet

INTELLIGENT ALARM SYSTEM WITH SNOW SENSOR

FIELD OF THE INVENTION

The present invention relates to an intelligent alarm system for use inside a building which detects the presence of snow outside of the building. More particularly, the system generates an alarm upon detection of the accumulation of a significant amount of snow.

BACKGROUND OF THE INVENTION

It is a common occurrence in many areas during winter months that a significant amount of snow accumulates overnight. As a result, many individuals whose activities are affected by such snowfall, need or want to be alerted when a significant amount of snow accumulates. For example, motorists or commuters may need additional time to clear walks or drives, and to travel to their destinations.

To accommodate this problem devices have been suggested to alert an individual when significant snow has accumulated during a period of sleep. U.S. Pat. No. 3,259,894 discusses a snow alarm involving a mechanical device for outdoor use. The device is designed to capture and retain fallen snow and selectively sound an alarm at varying degrees of snowfall.

U.S. Pat. No. 4,122,660 relates to an electromechanical alarm system which uses two separately activated alarm switches. The alarm switches are attached to a snow detector which is adapted to close a mechanical switch when a particular snowfall condition is sensed.

No prior art device has attained any significant degree of commercial success to my knowledge.

The prior art devices are not sufficiently adaptable to varying environmental conditions and user preferences. These devices require the use of outdoor mechanical devices, and are severely limited in their ability to accommodate changing environmental conditions and user preferences.

A need continues to exist for a simple, low cost snow alarm system which can reliably detect the presence of snow accumulation without the use of complicated mechanical devices or outdoor sensors. A further need exists for an intelligent alarm system which is capable of accommodating a variety of performance parameters and conditions by using both preprogrammed and acquired data to generate an appropriate alarm signal.

SUMMARY OF THE INVENTION

The intelligent alarm system of the present invention provides a reliable, low cost system for alerting a user to the presence of snow outside of a building. The system includes a sensor and an intelligent alarm clock for use inside a building or dwelling. The system can be set by a user to signal an alarm a programmable amount of time earlier than the user's normal waking time if an accumulation of snow is detected. This system saves a user the inconvenience of getting up early unnecessarily on mornings when snow has not accumulated, and automatically wakes the user up at an appropriate time when snow does accumulate.

The system is intelligent in that it is capable of accumulating data from the sensor, and processing the data along with other preprogrammed data and user entered data to determine whether a true snow condition exists. The system then generates an appropriate alarm signal.

Since the system is designed for use indoors it does not require costly weatherproof materials necessary in the prior art. The system also does not require any mechanical parts which are prone to wear and possible failure.

DETAILED DESCRIPTION OF THE PREFERRED EMBODIMENTS

Figure 1:
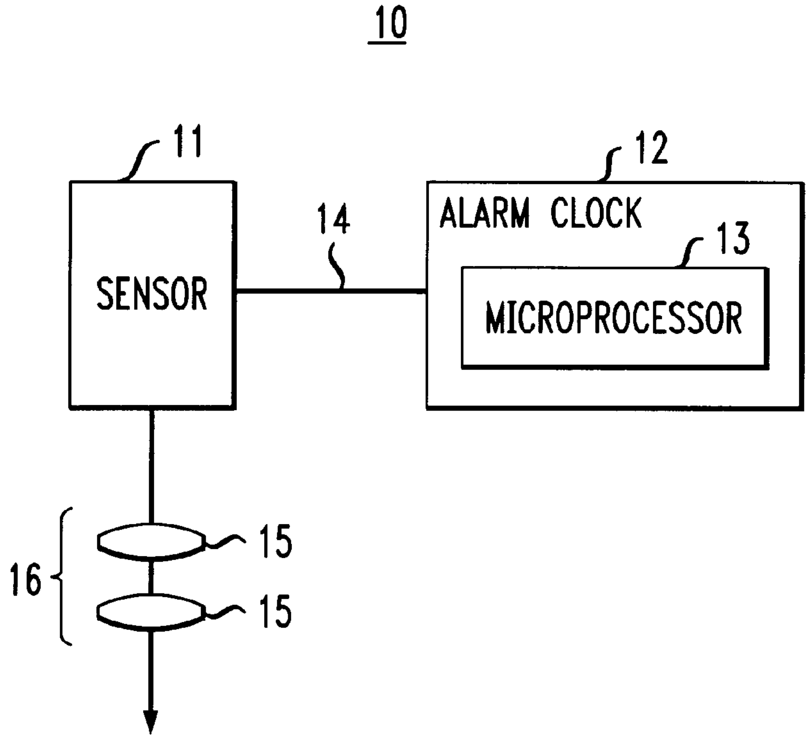
FIG. 1 is a block diagram of one embodiment of the invention.

As shown in FIG. 1, the intelligent alarm system 10 of the present invention comprises an intelligent alarm clock 12 and a sensor 11 for use inside of a building or dwelling. The sensor 11 is designed to detect the presence of snow outside of the building and generate an appropriate data signal. The sensor 11 may be conveniently mounted on the inside of a window and directed outward to collect environmental data. In one embodiment of the invention, the sensor 11 comprises a light sensor with a restricted field of view that senses the higher than normal reflectance of ambient light from snow cover in the area outside the window.

In another embodiment of the invention, the sensor 11 comprises a more complex device which is capable of measuring the reflectance at a particular point outside of the building. In operation, a user focuses the sensor 11 at a particular spot on a path, drive or roadway. The sensor 11 measures the reflectance from that point and generate a data signal therefrom. The sensor 11 may comprise a simple passive light sensor, or include an active light source such as a light emitting diode working in combination with a photocell. The sensor 11 may also include a focusing means such as a lens 15 or series 16 of lenses 15 which can be focused on the aforementioned point outside of the building, and defocus the near field in order to avoid misinterpreting frost on the window as snow on the ground.

The sensor 11 may also be designed to measure other environmental conditions such as ambient light scatter, sunlight intensity or temperature. This data can be incorporated into the data signal generated by the sensor 11 and used to determine whether a true snow condition exists. The data signal generated by the sensor 11 is received by the alarm clock 12 via a connecting wire 14. The sensor 11 and the alarm clock 12 may also incorporate apparatus which allows for wireless transmission of the data signal from the sensor 11 to the alarm clock 12, thus eliminating the need for a connecting wire.

The alarm clock 12 comprises a microprocessor 13 which processes the data signal from the sensor 11 and generates an alarm signal in response thereto. In one embodiment of the invention, the microprocessor 13 is capable of processing preprogrammed data and user entered data in addition to the data signal from the sensor 11 to generate an appropriate alarm signal. The preprogrammed data can include known environmental data such as sunrise and sunset times for the particular area where the alarm system 10 is to be used. It can also include a predetermined range of ambient light values which are known to indicate the presence of snowfall.

The user entered data can include information such as the user's "normal" waking time and an earlier or later waking time used when a snow condition is detected. User entered data can also include a variety of user entered performance parameters. These parameters can include limits on system operation which allow the user to customize the alarm system based on his or her specific needs.

In another embodiment, the microprocessor 13 is capable of storing the data transmitted from the sensor 11 to create a historical record or database. The database can also include the operating conditions of the alarm system 10 at the time the data from sensor 11 was obtained. The alarm system 10 can then use this historical data to more accurately determine whether a true snow condition exists. For example, over a period of time the system can detect or "learn" common weather patterns in which a significant quantity of snow accumulates. The alarm system 10 then uses this learned information to test future determinations of whether snow has accumulated.

Figure 2:
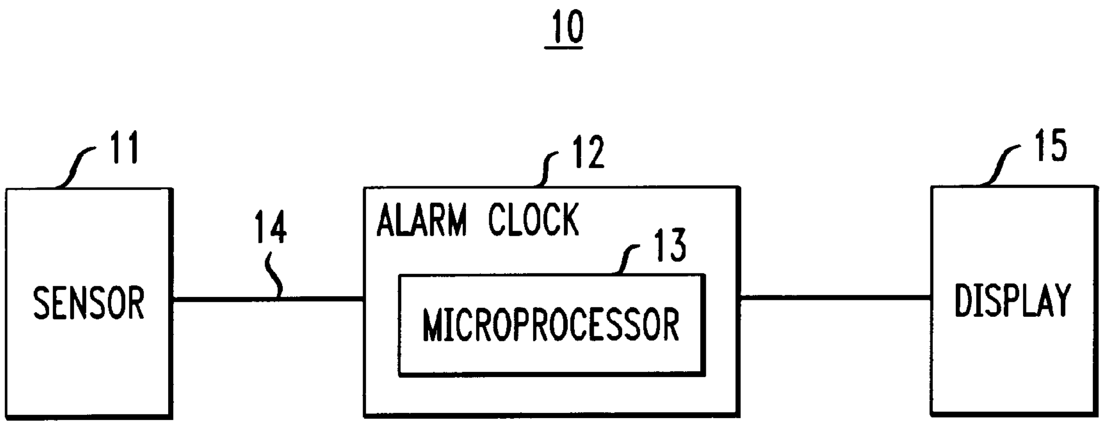
FIG. 2 is a block diagram of an alternate embodiment of the invention which includes a display.

In another embodiment of the invention, as shown in FIG. 2, the alarm clock 12 also includes a display 15 for displaying various system information such as time, date, system status (i.e. on/off), or other information transmitted from the sensor 11.

Although the present invention has been described with reference to preferred embodiments, it can be readily understood that the present invention is not restricted to the preferred embodiments and that various changes and modifications can be made by those skilled in the art without departing from the spirit and scope of the present invention.

What is claimed is:

1. An intelligent alarm system comprising:

a sensor for use inside a building to detect environmental conditions outside of said building adapted to generate a data signal, wherein said sensor comprises a photo sensor and focusing means for measuring reflectance at a point outside of and remote from said building; and an alarm clock having a microprocessor for receiving said data signal from said sensor and generating an alarm signal in response to said data signal.

2. An intelligent alarm system as in claim 1, wherein said sensor is capable of detecting the presence of snow outside of said building.

3. An intelligent alarm system as in claim 2, further comprising a memory device for storing preprogrammed data, user data and data from said sensor, wherein said microprocessor processes all of said data and generates an alarm signal in response thereto.

4. An intelligent alarm system as in claim 1, further comprising a means for mounting said sensor on the inside of a window.

5. An intelligent alarm system as in claim 1, wherein said sensor measures ambient light scatter outside of said building, and wherein said microprocessor generates an alarm signal from said sensor data.

6. An intelligent alarm system as in claim 1, wherein said sensor includes wireless transmitter means for transmitting data to said alarm clock.

7. An intelligent alarm system as in claim 1, wherein said alarm clock further comprises a display.

8. An intelligent alarm system as in claim 1, wherein said microprocessor is programmed to generate a normal wake up time alarm signal in the absence of snow conditions detected by said sensor, and an earlier snow wake up time alarm signal when snow conditions are detected by said sensor.

9. A method for generating an early wake up time alarm signal during environmental conditions in which a user expects adverse driving conditions comprising providing a sensor inside a building, said sensor adapted to detect environmental conditions outside the building and to generate a data signal corresponding to said conditions, wherein said sensor comprises a photo sensor and focusing means for measuring reflectance at a point outside of and remote from said building, providing an alarm clock having a microprocessor, said clock adapted to receive said data signal, and generating an alarm signal at a different time than the normal wake up time when adverse conditions are detected.

10. A method according to claim 1 wherein said adverse conditions are snow, and said sensor comprises a photo sensor and focusing means for measuring reflectance at a point outside said building.

11. An intelligent alarm system comprising:

a sensor for use inside a building to detect the environmental conditions outside of said building adapted to generate a data signal, wherein said sensor includes focusing means adapted to defocus the near field so as to avoid a false reading due to frost on a window;

an alarm clock having a microprocessor for receiving said data signal from said sensor and generating an alarm signal in response to said data signal.

* * * * *

UNITED STATES PATENT AND TRADEMARK OFFICE

CERTIFICATE OF CORRECTION

PATENT NO. : 6,057,769

DATED : May 2, 2000

INVENTOR(S) : Carl R. Stevenson

It is certified that error appears in the above-indentified patent and that said Letters Patent is hereby corrected as shown below:

In Claim 1, line 2, please delete "for use" and insert --located--.

In Claim 11, line 2, please delete "for use" and insert --located--.

Signed and Sealed this

Twentieth Day of March, 2001

Nicholas P. Godici

Attest:

NICHOLAS P. GODICI

*Attesting Officer* *Acting Director of the United States Patent and Trademark Office*